(12) United States Patent
Tsuto

(10) Patent No.: US 6,381,000 B1
(45) Date of Patent: Apr. 30, 2002

(54) METHOD OF AND APPARATUS FOR SCANNING SHEET

(75) Inventor: Satoru Tsuto, Kanagawa-ken (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/533,677

(22) Filed: Mar. 23, 2000

(30) Foreign Application Priority Data

Mar. 24, 1999 (JP) .......................... 11-080410

(51) Int. Cl.$^7$ .......................... G03B 27/00; H04N 1/04
(52) U.S. Cl. .......................... 355/18; 358/474; 358/498; 271/225
(58) Field of Search .......................... 358/474, 496, 358/498; 271/10.09, 10.01, 225; 399/361, 365, 377, 397; 355/18; 378/182, 184, 185, 188

(56) References Cited

U.S. PATENT DOCUMENTS

| | | | |
|---|---|---|---|
| 4,745,490 A | * | 5/1988 | Shimizu et al. .......................... 347/262 |
| 6,281,980 B1 | * | 8/2001 | Maemura et al. .......................... 358/1.14 |
| 6,333,797 B1 | * | 12/2001 | Katsuta et al. .......................... 271/270 |

* cited by examiner

Primary Examiner—Alan A. Mathews
(74) Attorney, Agent, or Firm—Sughrue Mion, PLLC (57) ABSTRACT

An image information reading apparatus has a sheet feeder for feeding a stimulable phosphor sheet and a reading unit for scanning the stimulable phosphor sheet two-dimensionally. The reading unit has a storage zone for separating the stimulable phosphor sheet in its entirety from the sheet feeder and temporarily storing the stimulable phosphor sheet. The reading unit does not require a nip releasing mechanism for releasing the stimulable phosphor sheet from a nipping action of the sheet feeder when the stimulable phosphor sheet is scanned.

11 Claims, 7 Drawing Sheets

METHOD OF AND APPARATUS FOR SCANNING SHEET

BACKGROUND OF THE INVENTION

1. Field of the Invention

The present invention relates to a method of and an apparatus for applying a light beam to a sheet such as a photographic film, a stimulable phosphor sheet, or the like to scan the sheet.

2. Description of the Related Art

There is known a system for recording radiation image information of a subject such as a human body with a stimulable phosphor, and reproducing the recorded radiation image information on a photosensitive medium such as a photographic film, or displaying the recorded radiation image information on a display device such as a CRT or the like.

The stimulable phosphor is a phosphor which, when exposed to an applied radiation (X-rays, $\alpha$-rays, $\gamma$-rays, electron beams, ultraviolet radiation, or the like), stores a part of the energy of the radiation, and, when subsequently exposed to applied stimulating rays such as visible light, emits light in proportion to the stored energy of the radiation. Usually, a sheet provided with a layer of the stimulable phosphor is used as a stimulable phosphor sheet and stored in a cassette in the art.

The above known system includes an image information reading apparatus (scanning apparatus) which comprises a reading unit (scanning unit) for reading the recorded radiation image information from the stimulable phosphor sheet, and an erasing unit for erasing remaining image information from the stimulable phosphor sheet after the recorded image information has been read. The image information reading apparatus operates as follows: A cassette housing a stimulable phosphor sheet with radiation image information which has been recorded therein by an external exposure device is inserted into a loading unit of the image information reading apparatus. When the lid of the cassette is opened, the stimulable phosphor sheet is removed from the cassette by a suction mechanism, and then fed to the reading unit by a sheet feeding mechanism (sheet feeder). After the recorded image information is read from the stimulable phosphor sheet by the reading unit, the stimulable phosphor sheet is delivered to the erasing unit where any remaining radiation image information is erased from the stimulable phosphor sheet. The stimulable phosphor sheet is then returned into the cassette in the loading unit.

The above system also includes an image information reproducing apparatus (scanning apparatus) for reproducing radiation image information on a photographic photosensitive medium such as a photographic film or the like. The image information reproducing apparatus has a magazine which contains a plurality of photographic photosensitive mediums. In operation, one of the photographic photosensitive mediums at a time is removed from the magazine and delivered to a sheet feeding mechanism (sheet feeder), which feeds the photographic photosensitive medium to a recording unit (scanning unit). In the recording unit, the radiation image information obtained from the stimulable phosphor sheet is recorded on the photographic photosensitive medium.

In the image information reading apparatus and the image information reproducing apparatus, when a sheet-like member such as the stimulable phosphor sheet or the photographic photosensitive medium is fed to the scanning unit such as the reading unit or the recording unit by the sheet feeding mechanism, the sheet feeding mechanism needs to release the sheet-like member in order to allow only an auxiliary scanning feed means of the scanning unit to feed the sheet-like member highly accurately in an auxiliary scanning direction. Since the sheet feeding mechanism has a roller pair for nipping the sheet-like member while it is feeding the sheet-like member, a nip releasing mechanism is required to release the roller pair from the sheet-like member when the sheet-like member is transferred from the sheet feeding mechanism to the auxiliary scanning feed means. However, the nip releasing mechanism makes the apparatus complex in structure and results in a considerable increase in the cost of the apparatus.

SUMMARY OF THE INVENTION

It is a major object of the present invention to provide a method of and an apparatus for scanning a sheet-like member highly accurately with a simple and inexpensive arrangement without the need for a special mechanism for releasing the sheet-like member from a gripping action of a feeder.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
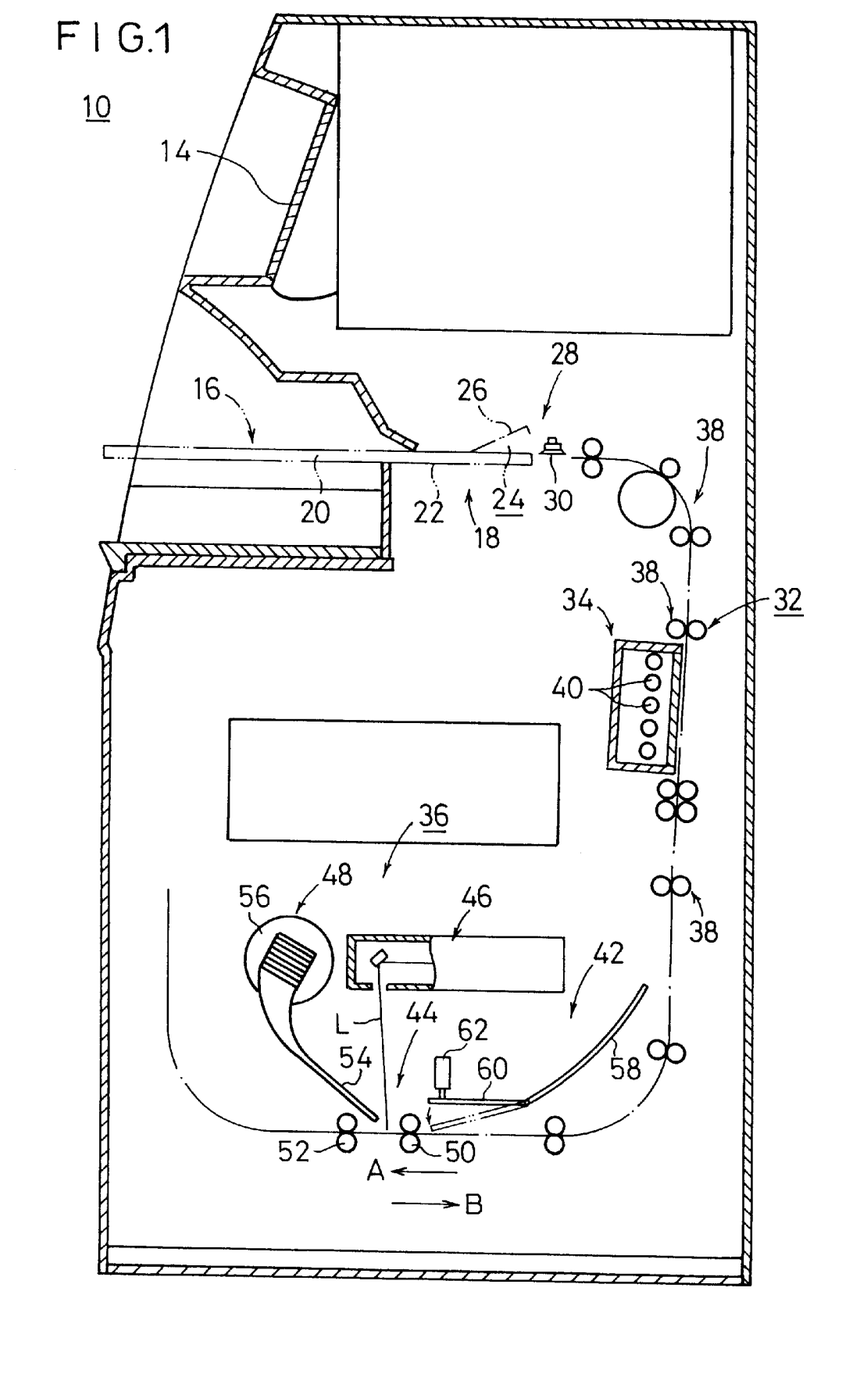
FIG. 1 is a schematic vertical cross-sectional view of an image information reading apparatus according to a first embodiment of the present invention.

FIG. 1 shows in schematic vertical cross section an image information reading apparatus (scanning apparatus) 10 according to a first embodiment of the present invention.

The image information reading apparatus 10 has a touch panel 14 in an upper left portion of the front wall of an apparatus housing. The touch panel 14 serves as a scanning control console operable by the operator for controlling the image information reading apparatus 10 and a monitor for displaying information for the operator. The image information reading apparatus 10 also has a cassette loading unit 18 disposed below the touch panel 14 for loading a cassette 16 removably therein. The cassette 16 comprises a casing 22 for storing a stimulable phosphor sheet (sheet-like member) 20 and a lid 26 for openably closing an opening 24 in the casing 22. The cassette loading unit 18 has an opening/closing means (not shown) for opening and closing the lid 26.

The cassette loading unit 18 also has a sheet delivery mechanism 28 for removing the stimulable phosphor sheet 20 from the cassette 16 and returning the stimulable phosphor sheet 20 into the cassette 16 after recorded radiation image information has been read and any remaining radiation image information has been erased from the stimulable phosphor sheet 20. The sheet delivery mechanism 28 has a plurality of suction cups 30 communicating with a negative pressure source (not shown).

The image information reading apparatus 10 includes an erasing unit 34 and a reading unit (scanning unit) 36 which are positioned below and connected to the sheet delivery mechanism 28 via a sheet feeder 32. The sheet feeder 32 has a plurality of roller pairs 38 which jointly make a vertical feed path. The erasing unit 34 comprises a plurality of erasing light sources 40 disposed along the vertical feed path.

The reading unit 36 comprises a storage zone 42 for separating the stimulable phosphor sheet 20 in its entirety from the sheet feeder 32 and temporarily storing the stimulable phosphor sheet 20, an auxiliary scanning feed means 44 for feeding the stimulable phosphor sheet 20 separated from the sheet feeder 32 in an auxiliary scanning direction indicated by the arrow A or B, an optical system (optical beam deflecting scanning means) 46 for applying a laser beam L to the stimulable phosphor sheet 20 which is being fed in the auxiliary scanning direction, in a main scanning direction that is substantially perpendicular to the auxiliary scanning direction, and a light guiding system 48 for photoelectrically reading light which is emitted from the stimulable phosphor sheet 20 upon exposure to the laser beam L applied thereto.

The auxiliary scanning feed means 44 comprises first and second roller pairs 50, 52 spaced horizontally from each other and rotatable in synchronism with each other. The light guiding system 48 comprises a light guide 54 disposed in a position where the stimulable phosphor sheet 20 is scanned by the laser beam L and extending along the main scanning direction, and a photomultiplier 56 mounted on the upper end of the light guide 54.

The storage zone 42 has an upwardly curved guide plate 58 whose dimension or length is commensurate with the length of the stimulable phosphor sheet 20 in the direction in which it is fed. The guide plate 58 has an end close to the first roller pair 50, to which there is swingably connected a movable guide plate 60 that can be angularly moved by an actuator 62 such as a solenoid to feed the stimulable phosphor sheet 20 selectively into the storage zone 42 and the sheet feeder 32. The movable guide plate 60 and the actuator 62 jointly serve as a path switcher.

Operation of the image information reading apparatus 10 will be described below with respect to a method of scanning a sheet-like member according to the first embodiment of the present invention.

The stimulable phosphor sheet 20, with radiation image information of a subject such as a human body or the like recorded therein by an exposure device (not shown), is stored in the cassette 16 in a light-shielded condition, and set in the cassette loading unit 18 of the image information reading apparatus 10. When the cassette 16 is loaded into the cassette loading unit 18, the lid 26 of the cassette 16 is angularly moved to a certain angular position by an unlocking means (not shown) in the cassette loading unit 18, thereby opening the opening 24.

Figure 2:
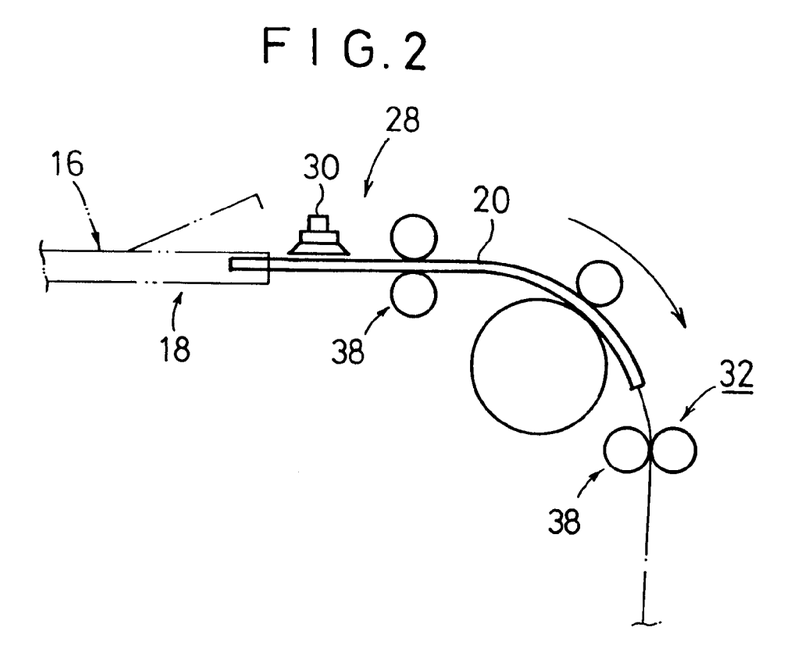
FIG. 2 is a side elevational view showing the manner in which a stimulable phosphor sheet is removed from a cassette in the image information reading apparatus shown in FIG. 1.

Then, the sheet delivery mechanism 28 is operated to move the suction cups 30 into the cassette 16, and the suction cups 30 attract the stimulable phosphor sheet 20 in the cassette 16. The suction cups 30 which is attracting the stimulable phosphor sheet 20 then moves out of the cassette 16 toward the sheet feeder 32 until the leading end of the stimulable phosphor sheet 20 is gripped by one of the roller pairs 38 of the sheet feeder 32 (see FIG. 2). Then, the suction cups 30 release the stimulable phosphor sheet 20, which is now taken over by the sheet feeder 32. The sheet feeder 32 is actuated to feed the stimulable phosphor sheet 20 through the erasing unit 34 to the reading unit 36.

Figure 3:
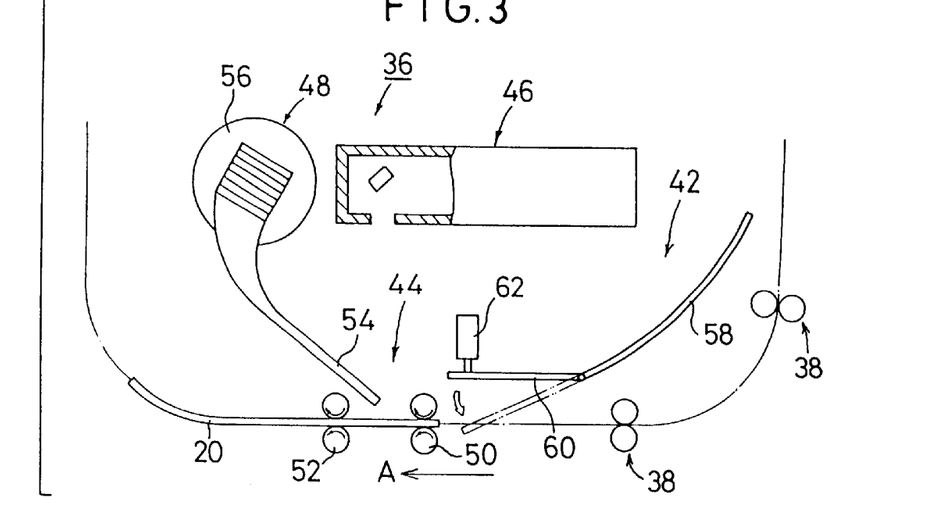
FIG. 3 is a side elevational view showing the manner in which the stimulable phosphor sheet is fed by an auxiliary scanning feed means in the image information reading apparatus shown in FIG. 1.

In the reading unit 36, the first and second roller pairs 50, 52 rotate in their normal direction in synchronism with each other to feed the stimulable phosphor sheet 20 in the auxiliary scanning direction indicated by the arrow A. When the trailing end of the stimulable phosphor sheet 20 is gripped by the first and second roller pairs 50, 52 (see FIG. 3), the first and second roller pairs 50, 52 are stopped against rotation, and the solenoid 62 is energized to turn the movable guide plate 60 from the solid-line position to the two-dot-and-dash-line position in FIG. 3, providing a path toward the storage zone 42.

Figure 4:
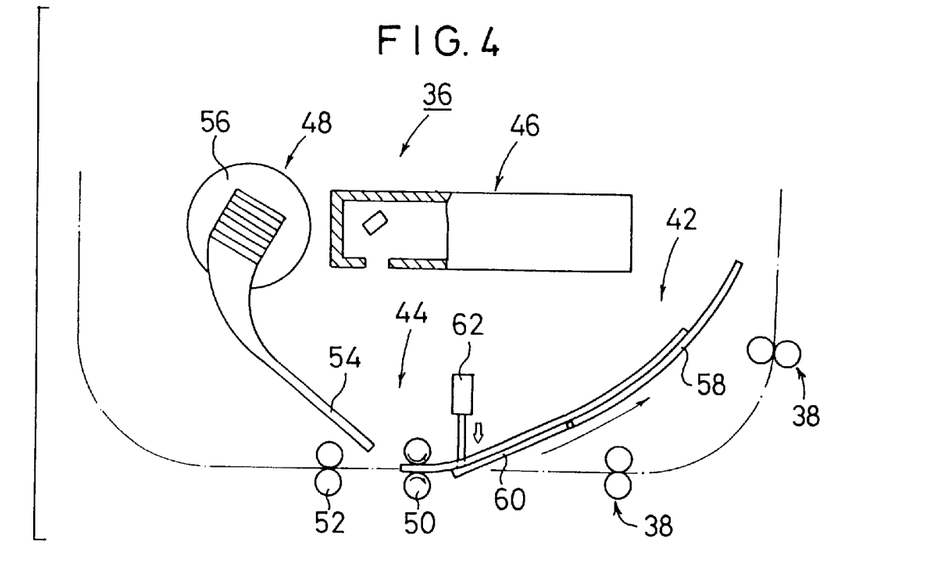
FIG. 4 is a side elevational view showing the manner in which the stimulable phosphor sheet is stored in a storage zone in the image information reading apparatus shown in FIG. 1.

Then, as shown in FIG. 4, the first and second roller pairs 50, 52 are reversed to feed the stimulable phosphor sheet 20 gripped thereby onto the guide plate 58 of the storage zone 42 while being guided by the movable guide plate 60. The stimulable phosphor sheet 20 is completely separated from the sheet feeder 32 and temporarily stored in the storage zone 42.

Figure 5:
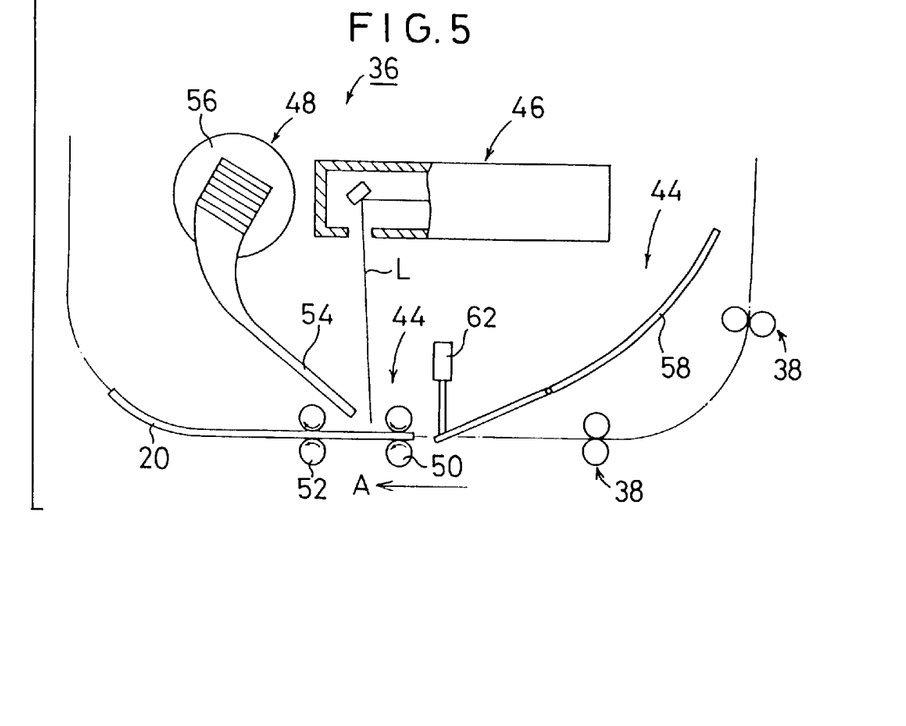
FIG. 5 is a side elevational view showing the manner in which the stimulable phosphor sheet is read in the image information reading apparatus shown in FIG. 1.

The first and second roller pairs 50, 52 then rotate again in their normal direction to feed the stimulable phosphor sheet 20 gripped thereby in the auxiliary scanning direction indicated by the arrow A, as shown in FIG. 5. The optical system 46 is energized to apply the laser beam L to the stimulable phosphor sheet 20 in the main scanning direction. Upon exposure to the laser beam L, the stimulable phosphor sheet 20 emits light proportional to the recorded radiation image information, and the emitted light is guided by the light guide 54 to the photomultiplier 56, which photoelectrically reads the radiation image information recorded in the stimulable phosphor sheet 20.

Figure 6:
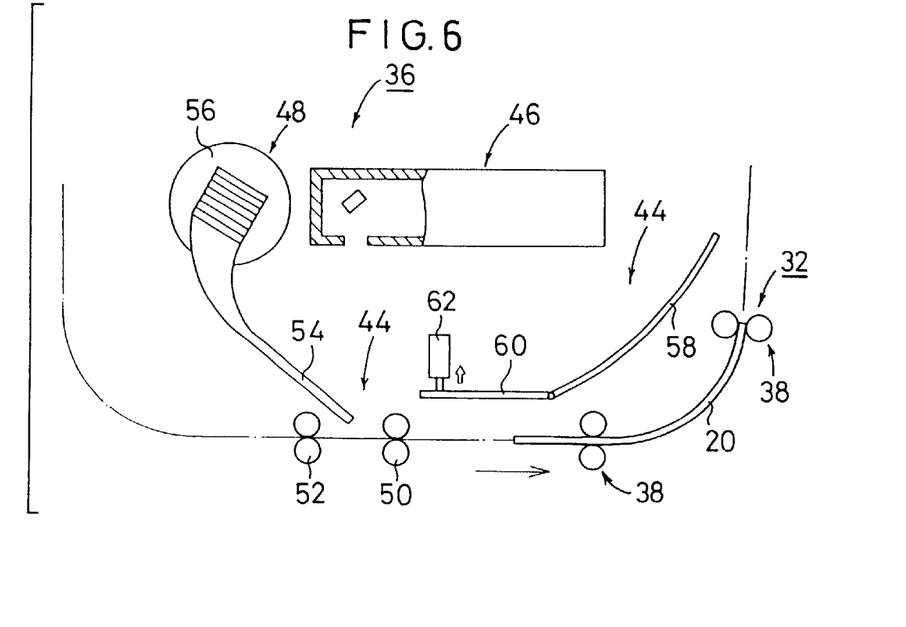
FIG. 6 is a side elevational view showing the manner in which the stimulable phosphor sheet is sent to a feeder after it has been read in the image information reading apparatus shown in FIG. 1.

After the recorded radiation image information has been read from the stimulable phosphor sheet 20 by the reading unit 36, the solenoid 62 is de-energized to turn the movable guide plate 60 upwardly (see FIG. 6). The stimulable phosphor sheet 20 is then fed back by the sheet feeder 32 into the vertical feed path. While the stimulable phosphor sheet 20 is being fed upwardly in the vertical feed path, any remaining image information in the stimulable phosphor sheet 20 is erased by the erasing light sources 40 of the erasing unit 34 (see FIG. 1). The stimulable phosphor sheet 20 is then returned by the sheet delivery mechanism 28 into the cassette 16, which is then pulled out of the cassette loading unit 18. At this time, the lid 26 is turned toward the casing 22 by the opening/closing means to close the opening 24.

Therefore, the cassette 16 with the opening 24 closed is removed from the image information reading apparatus 10.

In the first embodiment, as described above, the reading unit 36 has the storage zone 42 for temporarily storing the stimulable phosphor sheet 20 independently of, i.e., separately from, the sheet feeder 32. After the stimulable phosphor sheet 20 is separated from the sheet feeder 32 and temporarily stored in the storage zone 42, the stimulable phosphor sheet 20 is gripped by only the first and second roller pairs 50, 52 of the auxiliary scanning feed means 44 and fed in the auxiliary scanning direction indicated by the arrow A. Unlike the arrangement in which the stimulable phosphor sheet 20 is transferred from the sheet feeder 32 directly to the auxiliary scanning feed means 44 and two-dimensionally scanned thereby, the reading unit 36 does not require a nip releasing mechanism, which is relatively expensive, for releasing the stimulable phosphor sheet 20 from a nipping action of the roller pairs 38, and hence is economical.

The image information reading apparatus 10 is relatively simple because it only needs to have, as additional components, the storage zone 42 with the guide plate 58 and the movable guide plate 60 actuatable by the solenoid 62 for switching between the paths. Since the stimulable phosphor sheet 20 is fed in the auxiliary scanning direction by only the auxiliary scanning feed means 44, the radiation image information recorded in the stimulable phosphor sheet 20 can be read highly accurately.

In the first embodiment, after the stimulable phosphor sheet 20 fed by the sheet feeder 32 is delivered in the direction indicated by the arrow A by the auxiliary scanning feed means 44, the auxiliary scanning feed means 44 is actuated in the reverse direction to store the stimulable phosphor sheet 20 into the storage zone 42. The stimulable phosphor sheet 20 stored in the storage zone 42 is then fed in the auxiliary scanning direction by the auxiliary scanning feed means 44, during which time the recorded radiation image information is read from the stimulable phosphor sheet 20 by the application of the laser beam L thereto (see FIGS. 3 through 5).

Figure 7:
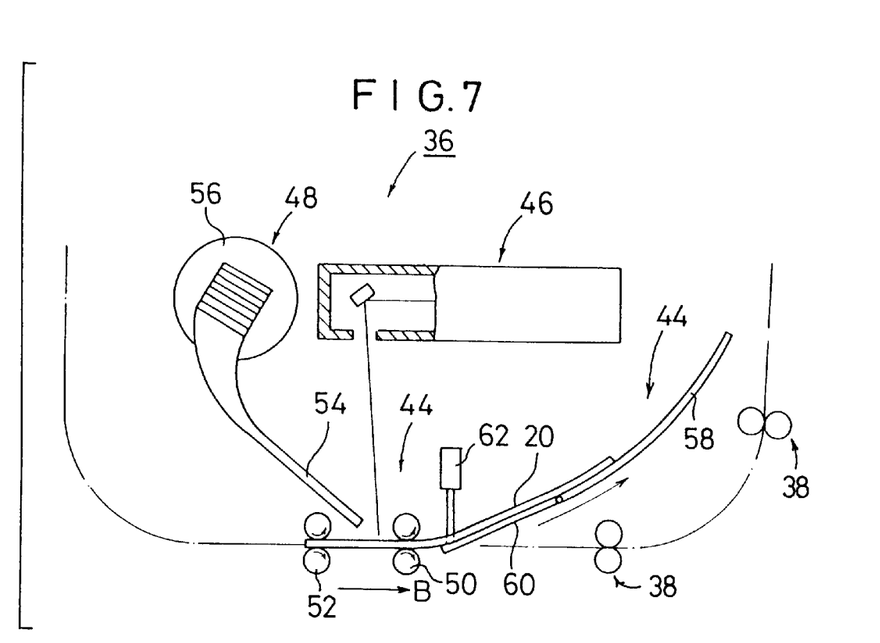
FIG. 7 is a side elevational view showing the manner in which the stimulable phosphor sheet is read when it is fed to the storage zone in the image information reading apparatus shown in FIG. 1.

However, after the stimulable phosphor sheet 20 has completely separated from the sheet feeder 32, as shown, the recorded radiation image information may be read from the stimulable phosphor sheet 20 by the application of the laser beam L thereto while the stimulable phosphor sheet 20 is being fed in the auxiliary scanning direction indicated by the arrow B by only the auxiliary scanning feed means 44 (see FIG. 7).

Figure 8:
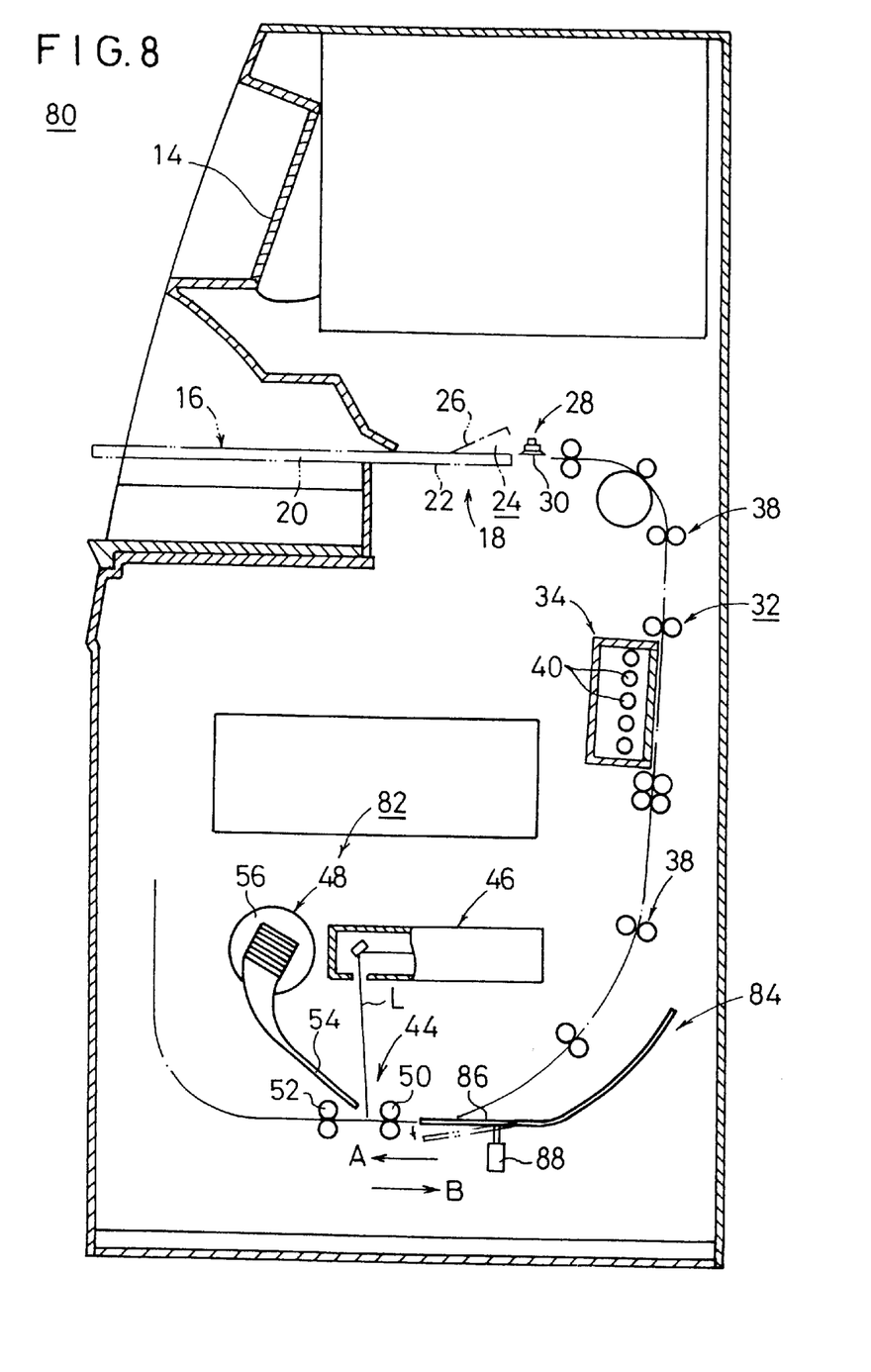
FIG. 8 is a schematic vertical cross-sectional view of an image information reading apparatus according to a second embodiment of the present invention.

FIG. 8 shows in schematic vertical cross section an image information reading apparatus (scanning apparatus) 80 according to a second embodiment of the present invention. Those parts of the image information reading apparatus 80 which are identical to those of the image information reading apparatus 10 according to the first embodiment are denoted by identical reference characters, and will not be described in detail below.

The image information reading apparatus 80 includes a reading unit (scanning unit) 82 having a storage zone 84. The storage zone 84 is positioned outwardly of the sheet feeder 32 and dimensioned so as to be able to store the entire length of the stimulable phosphor sheet 20. The sheet feeder 32 has a movable guide plate 86 for selectively feeding the stimulable phosphor sheet 20 into the sheet feeder and the storage zone 84. The movable guide plate 86 can be angularly moved by an actuator 88 such as a solenoid. The movable guide plate 86 and the actuator 88 jointly serve as a path switcher.

The image information reading apparatus 80 operates as follows: The stimulable phosphor sheet 20 delivered from the cassette 16 by the sheet feeder 32 is fed in the direction indicated by the arrow A by the auxiliary scanning feed means 44. Then, the movable guide plate 86 is angularly moved by the solenoid 88 from the two-dot-and-dash-line position to the solid-line position, after which the auxiliary scanning feed means 44 is actuated in the reverse direction to temporarily store the stimulable phosphor sheet 20 into the storage zone 84.

Thereafter, while the stimulable phosphor sheet 20 is being fed in the auxiliary scanning direction indicated by the arrow A by the first and second roller pairs 50, 52 of the auxiliary scanning feed means 44, the laser beam L is applied to the stimulable phosphor sheet 20 in the main scanning direction to read the recorded radiation image information from the stimulable phosphor sheet 20.

In the second embodiment, inasmuch as the stimulable phosphor sheet 20 is temporarily stored in the storage zone 84, the stimulable phosphor sheet 20 can fully be separated from the sheet feeder 32 and gripped and fed in the auxiliary scanning direction by only the auxiliary scanning feed means 44. Therefore, as with the first embodiment, no mechanism for releasing the stimulable phosphor sheet 20 from a nipping action of the roller pairs 38 of the sheet feeder 32 is required.

Figure 9:
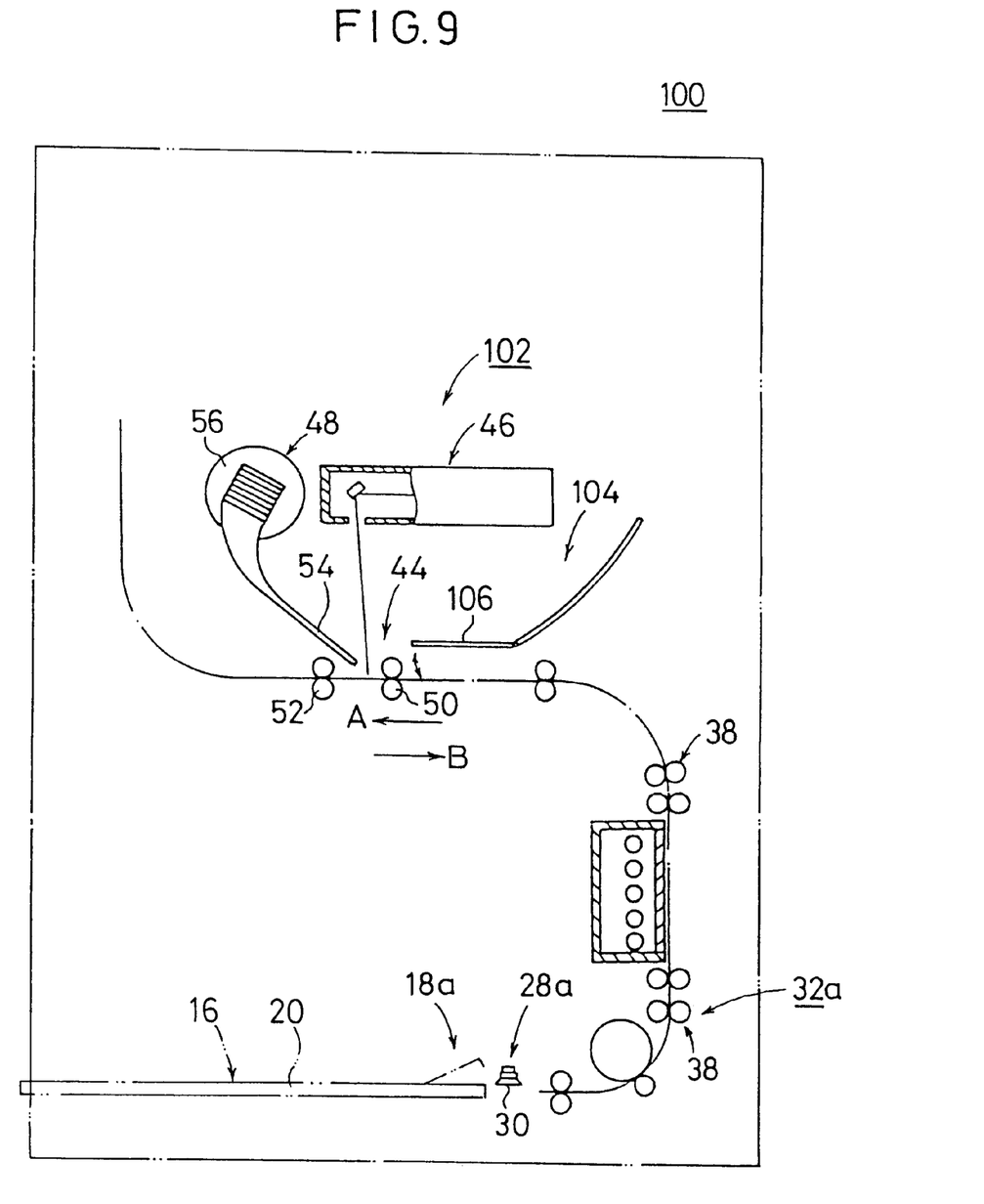
FIG. 9 is a schematic vertical cross-sectional view of an image information reading apparatus according to a third embodiment of the present invention.

FIG. 9 shows in schematic vertical cross section an image information reading apparatus (scanning apparatus) 100 according to a third embodiment of the present invention. Those parts of the image information reading apparatus 100 which are identical to those of the image information reading apparatus 10 according to the first embodiment are denoted by identical reference characters, and will not be described in detail below.

The image information reading apparatus 100 includes a cassette loading unit 18*a* and a sheet delivery mechanism 28*a* which are positioned in a lower portion of an apparatus housing, and a reading unit (scanning unit) 102 positioned in an upper portion of the apparatus housing. A sheet feeder 32*a* feeds the stimulable phosphor sheet 20 in the cassette 16 loaded in the cassette loading unit 18*a* to the reading unit 102.

The reading unit 102 has a storage zone 104 comprising a guide plate curved upwardly. A movable guide plate 106 is angularly movably connected to an end of the guide plate for selectively feeding the stimulable phosphor sheet 20 into the sheet feeder 32*a* and the storage zone 104. The movable guide plate 106 can be angularly moved by an actuator (not shown).

The image information reading apparatus 100 operates as follows: The stimulable phosphor sheet 20 is temporarily stored in the storage zone 104 when the movable guide plate 106 is turned upwardly. Thereafter, while the stimulable phosphor sheet 20 is being fed in the auxiliary scanning direction indicated by the arrow A by being gripped by only the auxiliary scanning feed means 44, the laser beam L is applied to the stimulable phosphor sheet 20 in the main scanning direction to read the recorded radiation image information from the stimulable phosphor sheet 20. Consequently, the reading unit 102 does not require a nip releasing mechanism for releasing the stimulable phosphor sheet 20 from a nipping action of the roller pairs 38 of the sheet feeder 32*a*, and hence is economical, as with the first and second embodiments.

In the second and third embodiments, after the stimulable phosphor sheet 20 is temporarily stored in the storage zones 84, 104, the recorded radiation image information is read from the stimulable phosphor sheet 20 while the stimulable phosphor sheet 20 is being fed in the auxiliary scanning direction by the auxiliary scanning feed means 44. However, as described above with respect to the first embodiment with reference to FIG. 7, the recorded radiation image information may be read from the stimulable phosphor sheet 20 while the stimulable phosphor sheet 20 is being fed into the storage zones 84, 104.

The first through third embodiments are directed to the image information reading apparatus 10, 80, 100 which read the recorded radiation image information from the stimulable phosphor sheet 20 and erase the remaining radiation image information from the stimulable phosphor sheet 20. However, the principles of the present invention are also applicable to an image information reproducing apparatus for reproducing radiation image information on a photographic film.

As described above, in the method of and the apparatus for scanning the sheet-like member according to the present invention, since the scanning unit has the storage zone for separating the sheet-like member from the sheet feeder and temporarily storing the sheet-like member, the sheet-like member can be fed in the auxiliary scanning direction while being completely separated from the sheet feeder. Therefore, for feeding the sheet-like member in the auxiliary scanning direction, it is not necessary to provide a releasing mechanism for releasing the sheet-like member from the sheet feeder. Therefore, the scanning apparatus is relatively simple in structure and inexpensive to manufacture.

Although certain preferred embodiments of the present invention have been shown and described in detail, it should be understood that various changes and modifications may be made therein without departing from the scope of the appended claims.

What is claimed is:

1. A method of scanning a sheet-like member, comprising the steps of:

feeding the sheet-like member with a sheet feeder;

separating the sheet-like member in its entirety from said sheet feeder and storing the sheet-like member into a storage zone of a scanning unit;

feeding said sheet-like member from said storage zone separately from said sheet feeder in an auxiliary scanning direction, which is substantially perpendicular to a direction in which a light beam is deflected one-dimensionally, with only auxiliary scanning feed means of said scanning unit, and applying said light beam to said sheet-like member for thereby scanning said sheet-like member two-dimensionally; and transferring said sheet-like member which has been scanned two-dimensionally to said sheet feeder.

2. A method according to claim 1, further comprising the step of:

selectively feeding said sheet-like member into said sheet feeder and said storage zone with a path switcher.

3. A method of scanning a sheet-like member, comprising the steps of:

feeding the sheet-like member with a sheet feeder;

separating the sheet-like member in its entirety from said sheet feeder, and thereafter feeding said sheet-like member toward a storage zone of a scanning unit in an auxiliary scanning direction, which is substantially perpendicular to a direction in which a light beam is deflected one-dimensionally, with only auxiliary scanning feed means of said scanning unit, and applying said light beam to said sheet-like member for thereby scanning said sheet-like member two-dimensionally; and transferring said sheet-like member which has been scanned two-dimensionally from said storage zone to said sheet feeder.

4. A method according to claim 3, further comprising the step of:

selectively feeding said sheet-like member into said sheet feeder and said storage zone with a path switcher.

5. An apparatus for scanning a sheet-like member, comprising:

a sheet feeder for feeding a sheet-like member; and a scanning unit for applying a light beam to said sheet-like member to scan the sheet-like member two-dimensionally;

said scanning unit comprising:

a storage zone for separating said sheet-like member in its entirety from said sheet feeder and temporarily storing said sheet-like member;

light beam deflecting scanning means for applying a light beam which is deflected one-dimensionally to said sheet-like member which has been separated from said sheet feeder; and auxiliary scanning feed means for feeding said sheet-like member in an auxiliary scanning direction which is substantially perpendicular to the direction in which said light beam is applied.

6. An apparatus according to claim 5, wherein said scanning unit further comprises:

a path switcher for selectively feeding said sheet-like member into said sheet feeder and said storage zone.

7. An apparatus according to claim 6, wherein said path switcher comprises:

a movable guide plate; and an actuator for angularly moving said movable guide plate.

8. An apparatus according to claim 5, wherein said sheet feeder comprises roller pairs for gripping and feeding said sheet-like member.

9. An apparatus according to claim 5, wherein said auxiliary scanning feed means comprises first and second roller pairs which are rotatable in synchronism with each other.

10. An apparatus according to claim 5, wherein said storage zone has a curved guide plate having a dimension commensurate with the length of said sheet-like member in the direction in which the sheet-like member is fed.

11. An apparatus according to claim 5, wherein said sheet-like member comprises a stimulable phosphor sheet.

* * * * *